June 27, 1950  N. E. ANDERSON  2,512,705

FLUID-COOLED GAS-BLANKETED ARC WELDING TORCH

Filed Oct. 25, 1947  2 Sheets-Sheet 1

INVENTORS
NELSON E. ANDERSON
GEORGE R. TURBETT
ATTORNEYS

June 27, 1950  N. E. ANDERSON  2,512,705
FLUID-COOLED GAS-BLANKETED ARC WELDING TORCH
Filed Oct. 25, 1947  2 Sheets-Sheet 2

INVENTORS
NELSON E. ANDERSON
GEORGE R. TURBETT
ATTORNEYS

Patented June 27, 1950

2,512,705

UNITED STATES PATENT OFFICE 2,512,705

FLUID-COOLED GAS-BLANKETED ARC WELDING TORCH

Nelson E. Anderson, Scotch Plains, and George R. Turbett, East Orange, N. J., assignors to Air Reduction Company, Incorporated, a corporation of New York Application October 25, 1947, Serial No. 782,102

17 Claims. (Cl. 219—15)

This invention relates to inert gas shielded arc welding and more particularly to an improved electrode holder for use in the inert gas shielded arc welding field.

As is well known in the arc welding art, the inert gas shielded arc welding process is one in which an arc is struck between the work-piece and an electrode to produce the necessary welding heat, and an envelope of inert gas, usually helium or argon, is maintained around the arc and the weld puddle to prevent oxidation. The process is applicable to both manual and machine welding operations. Sometimes a depositing electrode of the stick or wire type is employed and is automatically fed toward the work as it is consumed. At other times a non-consuming electrode usually made of tungsten is employed.

The principal object of this invention is to provide an improved electrode holder adapted for use in the inert gas shielded arc welding process and adapted to hold an electrode of the tungsten or other non-consuming type.

Among the novel and important features of the improved electrode holder are an assemblage of parts so constructed and associated as to produce an electrode holder that is very rugged and compact and that is capable of fitting in the usual sleeve-type torch holder; improved gripping means for the electrode adapted for use with electrodes of various sizes and which will grip the electrode without jamming; an assemblage of parts so constructed and associated as to provide a novel and efficient cooling system for the electrode and the current-conducting parts; an improved adjustable and readily replaceable cap or nozzle through which the inert shield-forming gas is discharged around the electrode; and full insulation for the body portion of the electrode holder and for its manually adjustable parts which is effective not only for the welding current but also for high frequency currents used to stabilize the arc.

While the electrode holder to be herein described was designed as a machine electrode holder, i. e. one intended for use on an automatic welding machine, some of its features are applicable to electrode holders of the manual type. Furthermore, some of its features are applicable to electrode holders that are not of the type that supplies arc-shielding gas.

Two forms of a machine electrode holder embodying the invention are illustrated in the accompanying drawings, in which.

Figure 1:
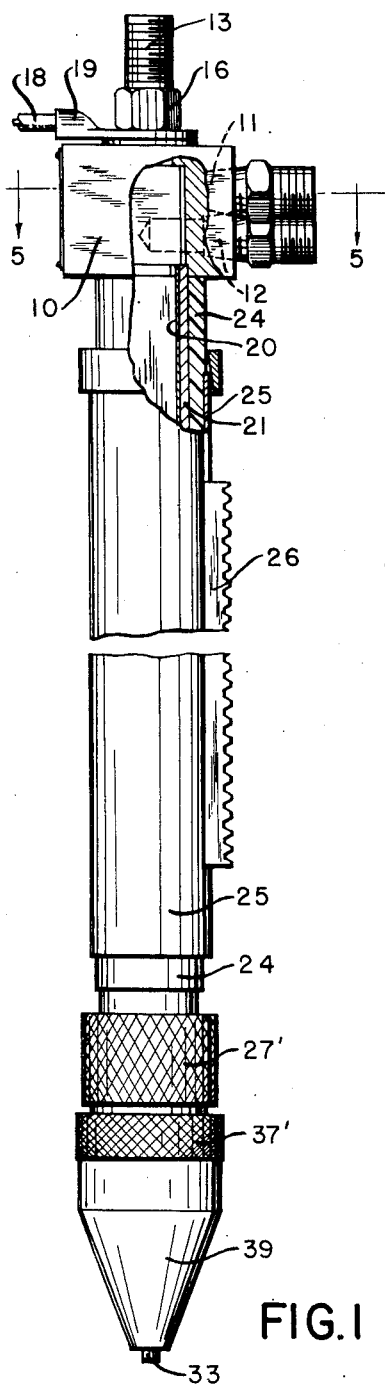
Figure 1 is a side elevation, partly broken away, of one form of the electrode holder.
Figure 5:
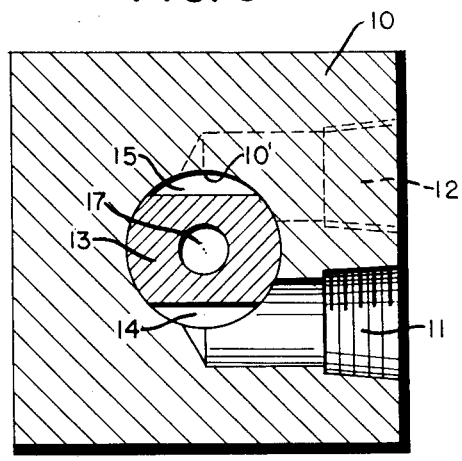
Fig. 5 is an enlarged horizontal section taken on the line 5—5 of Fig. 1.

Referring first to Figs. 1 and 5, a connector block 10 has a cooling water inlet passage 11 drilled and tapped in one side and a cooling water outlet passage 12 drilled and tapped in the same side but displaced vertically and horizontally from the inlet passage. Both passages terminate near the center line of the connector block 10 and communicate with an axial hole 10' drilled perpendicular to the cooling water passages (Fig. 5). A connector block insert 13 having two flat sides and two arcuate sides is brazed inside the axial hole 10' in the connector block leaving two separate passages 14 and 15 to conduct the cooling water in and out. Passage 14 is supplied from passage 11 and passage 15 discharges into passage 12. A portion of the insert 13 protrudes from the top of the connector block and is threaded as shown in Fig. 1 to receive a lug nut 16 and an inert gas supply line fitting. An axial hole 17 (Fig. 5) conducts the inert gas through the insert 13 to the torch barrel. The welding cable 18 (Fig. 1) terminates in a lug 19 which is fastened to the connector block and insert by the lug nut 16. The insert and connector block are electrically energized during welding but constitute no special hazard due to the remote location of these parts.

Figure 2:
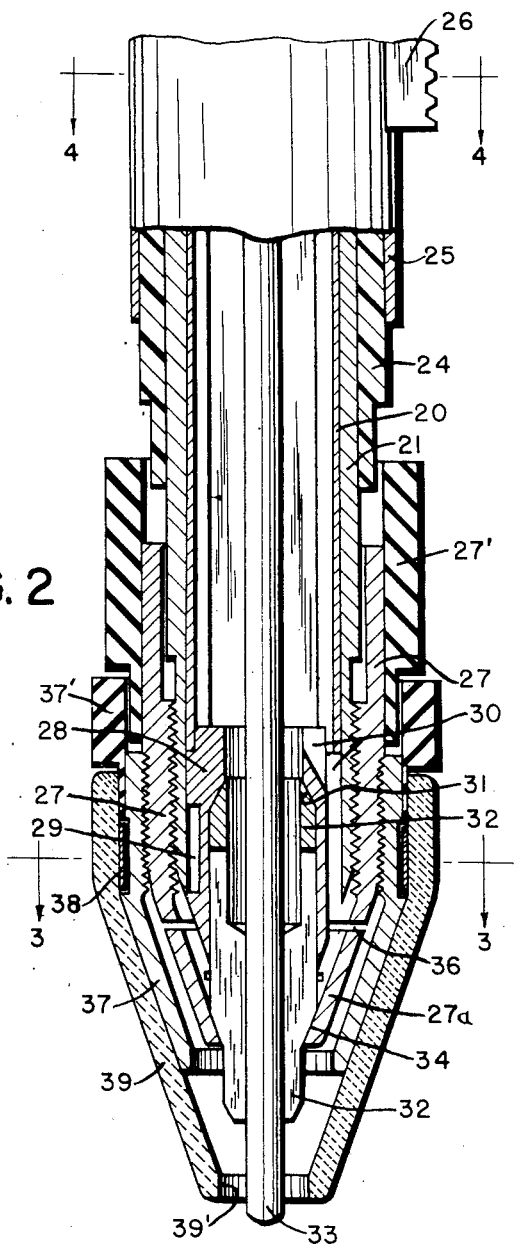
Fig. 2 is an enlarged vertical section of the lower portion of the electrode holder shown in Fig. 1.
Figure 4:
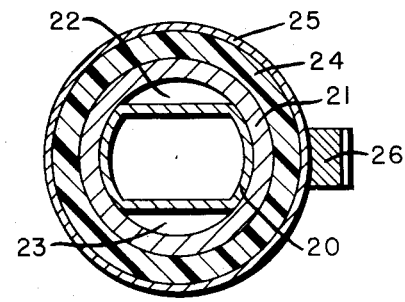
Fig. 4 is a horizontal section taken on the line 4—4 of Fig. 2.

Attached to the connector block and insert assembly is the barrel portion of the holder. A metal tube 20 (Figs. 1 and 2) having two flat sides and two arcuate sides, as shown in Fig. 4, is the center member of the barrel assembly, and serves as the inert gas conduit as well as a welding current conductor. The tube 20 is of the same cross-sectional size and shape as the connector block insert and is brazed or welded to the insert to form a gas-tight joint. Surrounding the tube 20 is a tube 21 (Figs. 1, 2 and 4) of circular section which fits snugly to form two separate passages 22 and 23 (Fig. 4) between the flat sides of the inner tube 20 and the outer tube 21. These passages match up with the similar passages 14 and 15 (Fig. 5) in the connector block assembly to conduct the cooling water through the barrel. The only possible source of leaks with this construction is from one water passage to the other, never into the gas stream. The upper end of tube 21 is metallically bonded to the connector block 10 to seal the cooling water passages. Since the tube 21 is connected to the connector block 10 and the inner tube 20 of the barrel, it also is electrically energized and serves as a conductor for the welding current. Surrounding the tube 21 is a layer of insulating material 24, such as polyethylene, which is of sufficient thickness to prevent breakdown even under the high radio frequency voltages used to stabilize the welding arc. Outside of the insulation is an outer cover tube 25 which carries a rack 26. The tube 25 and its rack are adapted to fit in the usual sleeve-type torch holder equipped with an adjusting pinion for the torch, and when thus positioned in the torch holder the rack 26 is engaged by the adjusting pinion so that the electrode holder can be adjusted axially in the torch holder by turning the pinion. The lower end of the tube 21 is threaded to receive a compression nut or collet sleeve 27 having an inwardly tapered collet-engaging sleeve portion 27a at its lower end.

A centrally bored bottom block 28 (Fig. 2) which fits up within the end of the tube 21 is metallically bonded to the lower end of the two tubes 20 and 21 of the barrel. This block has two flat sides that lead down as far as a slot 29 cut half around its periphery to allow passage of the cooling water from the inlet passage 22 to the outlet passage 23 (see also Fig. 3). The bottom block 28 also serves to channel the inert gas from the interior of tube 20 into the gas cap or nozzle hereinafter described. This is done by bevelling the corner and milling off one side of the block to form the connecting passage 30. A conical shoulder or seat 31 formed by enlarging the lower portion of the central bore of the block receives the conical upper end portion of an electrode adaptor or collet 32. This seat is machined to form a good contact with the electrode adaptor to conduct the welding current to the electrode as well as to conduct the heat back to the cooling water. The adaptor itself is machined to fit up in the enlarged portion of the central bore of the block 28. It has an axial hole in the center of suitable diameter to receive an electrode 33 and has a conical portion 34 on the outside near the lower end adapted to be engaged by the inwardly tapered sleeve portion 27a of the compression nut or collet sleeve 27. Slots 35 (Fig. 3) are cut in the adaptor or collet at 90 degree intervals to give it resilience and permit the electrode to be held in place by the collet and collet sleeve which function like a chuck. The adaptors or collets are changeable to permit the use of electrodes of various diameters, each size adaptor having the same outside dimensions but different inside diameters.

Figure 6:
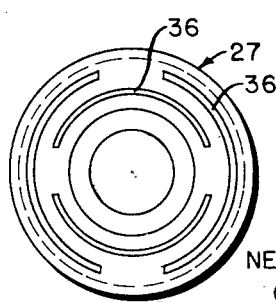
Fig. 6 is a bottom plan view of the compression nut or collet sleeve shown in Fig. 2.

The compression nut 27, preferably made of non-magnetic material, has a hand grip portion 27' made of insulating material for operator safety. This portion is press fit on the metallic portion. By turning the hand grip portion 27' the compression nut or collet sleeve 27 may be screwed on the threaded end of the tube 21 to cause its tapered sleeve portion 27a to force the collet jaws into gripping engagement with the electrode. Semi-circular slots 36 in different planes in the tapered portion 27a of the compression nut serve as gas ports to permit the flow of inert shielding gas into the gas cap. This arrangement of the slots is best shown in Fig. 6 which is a bottom view of the compression nut alone. In addition to acting as gas ports, the slots give resilience to the compression nut to allow for contraction and expansion caused by the extreme changes in temperature to which it is subjected when in use without jamming or loosening the collet and electrode.

Figure 3:
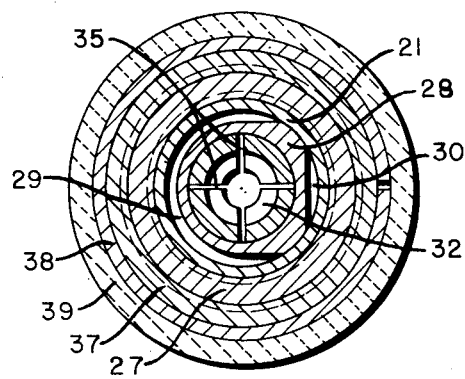
Fig. 3 is a horizontal section taken on the line 3—3 of Fig. 2.

The outer cylindrical surface of the compression nut 27 is threaded and a bushing 37 (Fig. 2) of cylindro-conical shape, matching the shape of the compression nut, is screwed onto it. A groove in the outer cylindrical surface of the bushing 37 receives a retaining ring 38, of resilient material, which is slit to form an unclosed ring as best shown in Fig. 3. It is bent slightly oval in shape to grip the groove in the bushing 37 and yet provide sufficient friction, in its expanding action, upon the inside of a gas cap 39 which it retains. The upper portion 37' of the bushing is made of insulating material and constitutes a hand grip portion by which the bushing can be turned on the threaded outer surface of the compression nut 27. The contact areas of the bushing and gas cap and the bushing and compression nut are made sufficiently large to carry the required amount of heat to the cooling water. Another function of the bushing is to retain the gas cap 39 accurately centered with respect to the electrode adaptor 32 and therefore with the electrode 33. By virtue of the bushing's threaded engagement with the compression nut, the bushing and gas cap are axially adjustable within certain limits.

The gas cap or nozzle 39 is of cylindro-conical shape and is made of a heat resistant non-conducting refractory or ceramic material such as silicon carbide. The inner diameter of its cylindrical portion provides a friction bearing surface upon the expanding retaining ring 38. The conical portion directs the shielding gas toward the arc and is designed to provide a uniform sheath of gas around the arc area and the molten puddle of the work metal. The gas cap orifice is cylindrical for a short distance, as shown at 39' in Fig. 2, allowing for some erosion of the cap tip before the orifice size will increase.

It will now be seen that a thoroughly practical inert gas shielded arc welding electrode holder has been produced. It is adaptable to various electrode sizes, is efficiently cooled, and gives good gas coverage. It is rugged and compact, fitting a common type of torch holder for support. It is fully insulated from the torch holder, and all parts of the lower portion of the assembly are insulated to prevent accidental shorting to work holding jigs or other apparatus, as well as being safe to operate. This includes insulation from high frequency arc-stabilizing voltage. The gas cap or nozzle is movable axially within certain limits to allow adjustment of its spacing from the work-piece during the welding operation to compensate for electrode burn off. The electrode, adaptor, and gas cap are readily replaced. The amount of protrusion of the electrode is easily adjusted and the various sizes of electrodes are firmly gripped for good electrical and thermal conductivity between the electrode and the water cooled conducting surface. The resilient construction of the compression nut produced by the slot type gas ports eliminates the possibility of the electrode and collet or adaptor becoming jammed. This takes care of different rates of expansion as well as different expansion coefficients of the parts. The large seating area of the conical gas cap on the conical bushing 37 assures concentricity of the cap with respect to the electrode, thus assuring good gas coverage. The electrode holder has high current carrying capacity because the electrode is gripped near its tip. If the welding current were carried through any great length of the electrode, overheating of the electrode would occur at high welding currents.

Figure 7:
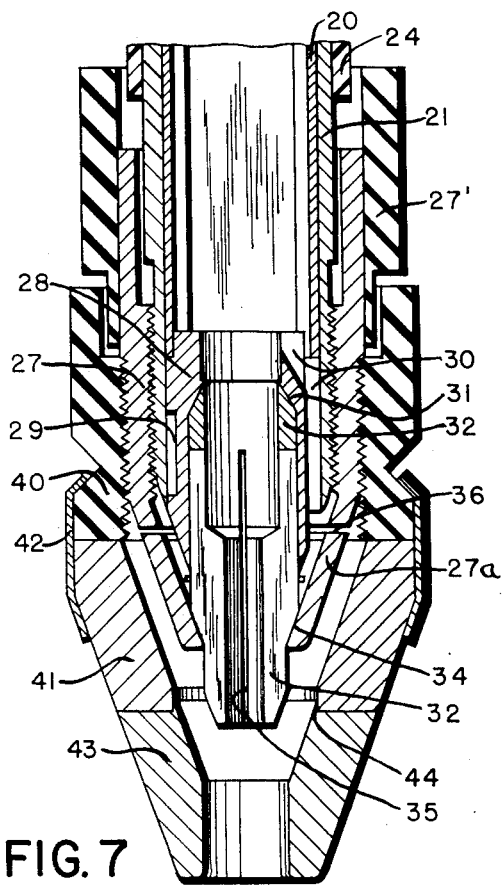
Fig. 7 is a vertical section through the lower portion of a modified form of electrode holder, this figure being drawn to the same scale as Fig. 2.

A modification of the electrode holder is illustrated in Fig. 7, in which the bushing 37, retaining ring 38 and the gas cap 39 are replaced by a magnetic gas cap assembly. A section of cylindrical insulating material 40 is threaded internally and engages the outside threaded portion of the compression nut 27. A conical shaped permanent magnet 41 is attached to the insulating material 40 by spinning a piece of soft aluminum tubing 42 over the two parts. A soft iron tip 43 is held in place by magnetic attraction to the permanent magnet 41, and centered by a shoulder 44 that extends a short distance inside the permanent magnet. The soft iron tip 43 is readily replaceable and serves to protect the permanent magnet from damage by the heat of the arc, and at the same time acts as an efficient conductor of magnetic flux to the arc region. The magnetic field prevents arc wandering, slipping, and blowing so the location of the arc on the work is always in the same position relative to the electrode. The magnetic gas cap assembly is an accessory to the electrode holder and is interchangeable with the ceramic gas cap assembly previously described.

The term "body portion" used in the accompanying claims means the portion of the electrode holder that comprises the tube 21 and the lower block 28, or their equivalents, with or without the inner tube 20 and the insulation and other parts surrounding the two tubes.

We claim:

1. An electrode holder comprising an electrically conductive body portion, a collet supported thereby having an axial opening to receive the electrode and resilient electrode-gripping jaws to hold the electrode in coaxial relation with said body portion, a collet sleeve having threaded connection with the body portion and surrounding the collet and engaging the jaws of the collet to press them against the electrode when the collet sleeve is screwed on the body portion, the lower part of the body portion having a collet-receiving socket, and the upper part of the collet having a socket-engaging portion with an external diameter corresponding to the internal diameter of said socket so that the collet is slidably and removably held in the socket whereby the collet may be removed and replaced by another similar one having a socket-engaging portion of the same external diameter but having a different size axial opening for another electrode of different diameter.

2. An electrode holder comprising an electrically conductive body portion, a collet supported thereby having an axial opening to receive the electrode and resilient electrode-gripping jaws to hold the electrode in coaxial relation with said body portion, a collet sleeve having threaded connection with the body portion and surrounding the collet and engaging the jaws of the collet to press them against the electrode when the collet sleeve is screwed on the body portion, the lower part of the body portion having a collet-receiving socket at the upper end of which there is a conical seat, and the upper part of the collet having a socket-engaging portion with an external diameter corresponding to the internal diameter of said socket and the upper end of which is tapered to fit said seat so that the collet is slidably and removably held in the socket in good electric contact with the body portion and whereby the collet may be removed and replaced by another similar one having a socket-engaging portion of the same external diameter but having a different size axial opening for another electrode of different diameter.

3. An electrode holder having a body portion comprising an electrically conductive tube, a block at the lower end of the tube having a central opening to accommodate an electrode and having a collet-receiving socket formed by an enlargement of the lower portion of said central opening, a collet the upper part of which has a socket-engaging portion with an external diameter corresponding to the internal diameter of said socket so that the collet is slidably and removably held in the socket, said collet also having an axial opening to receive an electrode and resilient electrode-gripping jaws adapted to hold the electrode in coaxial relation with said body portion, and a collet sleeve having threaded engagement with the lower end of said tube and surrounding the collet and engaging the jaws of the collet to press them against the electrode when the collet sleeve is screwed on said tube.

4. An electrode holder in accordance with claim 3 in which there is a conical seat at the upper end of the enlarged portion of the central opening of said block and in which the socket-engaging portion of the collet has a tapered upper end adapted to engage said seat to establish good electric contact with said block.

5. An electrode holder comprising a body portion constituting a gas conduit which is electrically conductive, a collet supported by the body portion in electric conducting contact therewith, said collet having an axial opening to receive the electrode and resilient electrode-gripping jaws adapted to hold the electrode in coaxial relation with said body portion, a collet sleeve having threaded connection with the body portion and surrounding the collet and engaging the jaws of the collet to press them against the electrode when the collet sleeve is screwed on the body portion, a gas nozzle assembly a portion of which telescopes over and has threaded engagement with a portion of said collet sleeve, an electrically insulated hand grip portion forming a part of the collet sleeve whereby the collet sleeve may be turned to operate the collet, an electrically insulated hand grip portion forming a part of the gas nozzle assembly and displaced from the hand grip portion on the collet sleeve axially of the body portion whereby the gas nozzle assembly can be turned to adjust it axially, and means forming gas passages placing the interior of the body portion in communication with the space in the gas nozzle around the electrode gripping jaws of the collet.

6. An electrode holder having a body portion comprising an outer cylindrical metal tube and an inner metal tube fitting within the outer tube and having two flat portions extending lengthwise of the tube, said inner tube making contact with the outer tube along the unflattened portions of the inner tube, the flattened portions thus forming with the wall of the outer tube two cooling-liquid passages which extend longitudinally of the tubes, electrode-gripping means supported by the lower end of the body portion in electric conducting contact with said tubes, means near the upper end of the body portion for supplying cooling-liquid to one of said passages and for discharging it from the other, and means placing the lower ends of said cooling-liquid passages in communication in the vicinity of said electrode-gripping means.

7. An electrode holder in accordance with claim 6 in which said means for placing the lower ends of said cooling-liquid passages in communication comprises a cylindrical block inserted in the lower end of said outer tube having its outer surface flattened along two areas to form with the adjacent wall of the outer tube continuations of said cooling-liquid passages, and said block further having a circumferential groove forming with the adjacent wall of said outer tube a connecting passage placing said cooling liquid passages in communication.

8. An electrode holder having a body portion comprising an outer cylindrical metal tube and an inner metal tube fitting within the outer tube and constituting a gas conduit and having two flat portions extending lengthwise of the tube, said inner tube making contact with the outer tube along the unflattened portions of the inner tube, the flattened portions thus forming with the wall of the outer tube two cooling-liquid passages which extend longitudinally of the tubes, electrode-gripping means supported by the lower end of the body portion in electric conducting contact with said tubes, means near the upper end of the body portion for supplying cooling-liquid to one of said passages and for discharging it from the other, means placing the lower ends of said cooling-liquid passages in communication in the vicinity of said electrode-gripping means, a gas nozzle supported by the lower end of the body portion in coaxial relation to the electrode and surrounding the electrode-gripping means, means for supplying gas to the upper end of said inner tube, and means forming gas passages placing the lower end of said inner tube in communication with the interior of said nozzle.

9. An electrode holder having a body portion comprising an outer cylindrical metal tube and an inner metal tube fitting within the outer tube and constituting a gas conduit and having two flat portions extending lengthwise of the tube, said inner tube making contact with the outer tube along the unflattened portions of the inner tube, the flattened portions thus forming with the wall of the outer tube two cooling-liquid passages which extend longitudinally of the tubes, a cylindrical metal block inserted in the lower end of said outer tube having a central opening to accommodate the electrode and having its outer surface flattened along two areas to form with the wall of the outer tube continuations of said cooling-liquid passages, and said block further having a circumferential groove forming with the adjacent wall of the outer tube a connecting passage placing said cooling-liquid passages in communication, means near the upper end of the body portion for supplying cooling-liquid to one of said cooling liquid passages and discharging it from the other, electrode-gripping means including a collet carried by said block, a gas nozzle supported at the lower end of the body portion in coaxial relation with the electrode and surrounding the electrode-gripping means, means for admitting gas to the interior of said inner tube, and means forming gas passages placing the lower end of the inner tube in communication with the interior of the gas nozzle.

10. An electrode holder in accordance with claim 9 having a collet sleeve threaded on the lower end of said outer tube and cooperating with the collet, said block being also flattened along a third area to form with the wall of the outer tube a passage to admit gas from the interior of said inner tube to the interior of the collet sleeve, and the collet sleeve having at least one circumferentially extending slot to admit the gas from its interior to the interior of the gas nozzle.

11. An electrode holder having a body portion comprising an outer cylindrical metal tube and an inner metal tube fitting within the outer tube and having two flat portions extending lengthwise of the tube, said inner tube making contact with the outer tube along the unflattened portions of the inner tube, the flattened portions thus forming with the wall of the outer tube two cooling-liquid passages which extend longitudinally of the tubes, electrode-gripping means supported by the lower end of the body portion in electric conducting contact with said tubes, means for placing the lower ends of said cooling-liquid passages in communication in the vicinity of said electrode-gripping means, and a block to which the upper ends of said tubes are secured, said block having an opening coaxial with said outer tube, a cylindrical insert fitting in said opening the outer wall of which has two flat portions which form with the inner wall of said opening in the block two block-passages constituting continuations of said liquid-cooling passages, and means forming passages extending laterally into said block for admitting cooling-liquid to one of said block-passages and for discharging it from the other.

12. An electrode holder in accordance with claim 11 having a gas nozzle supported by the lower end of the body portion and having gas passages placing the interior of said inner tube in communication with the interior of the gas nozzle, and in which said insert in the block at the upper ends of said tubes has a central gas passage communicating with the interior of said inner tube, the electrode holder further having means for admitting gas to said central passage.

13. An electrode holder comprising an electrically conductive body portion, a collet supported thereby and in electric conducting contact therewith, said collet having an axial opening to receive the electrode and resilient electrode-gripping jaws, and a collet sleeve having threaded connection with the body portion and having a collet-engaging portion cooperating with the collet to clamp the collet jaws against the electrode when the collet sleeve is screwed on the body portion, said collet-engaging portion of the collet sleeve having at least one circumferentially extending slot to increase the resiliency thereof.

14. An electrode holder comprising a body portion constituting a gas conduit which is electrically conductive, a collet supported thereby and in electric conducting contact therewith, said collet having an axial opening to receive the electrode and resilient electrode-gripping jaws, a collet sleeve having threaded connection with the body portion and having a collet-engaging portion cooperating with the collet to clamp the collet jaws against the electrode when the collet sleeve is screwed on the body portion, a gas nozzle supported at the lower end of the body portion in coaxial relation with the electrode and surrounding the electrode-gripping jaws and the collet-engaging portion of the collet sleeve, means for supplying gas to the interior of the body portion, and gas passages placing the interior of the body portion in communication with the interior of said nozzle and comprising at least one circumferentially extending slot in the collet-engaging portion of the collet sleeve.

15. An electrode holder comprising a body portion constituting a gas conduit which is electrically conductive, electrode-gripping means supported thereby and in electric conducting contact therewith, said body portion also including cooling-liquid passages leading to and from the vicinity of the electrode-gripping means and adapted to conduct cooling-liquid in heat exchange relation with the body portion, a gas nozzle assembly comprising a heat conductive bushing having threaded connection with a heat conductive part carried by said body portion and subject to the cooling effect of said cooling liquid, said gas nozzle assembly also comprising a refractory nozzle telescoping over and held on said bushing and which is coaxial with the electrode and surrounds the electrode-gripping means, said nozzle being adjustable axially by reason of said threaded connection of the bushing, an electrically insulated hand grip portion secured to said bushing whereby the gas nozzle assembly can be turned to adjust the nozzle axially, and means forming gas passages placing the interior of the gas conduit of the body portion in communication with the space in the nozzle surrounding the electrode-gripping means.

16. An electrode holder in accordance with claim 15 in which the refractory gas nozzle is held on said bushing by a split expansible ring engaging in a recess in the bushing and exerting an expansive force outwardly against the inner surface of the nozzle.

17. An electrode holder comprising a body portion which is electrically conductive, electrode-gripping means supported by said body portion and in electric conducting contact therewith, a nozzle made of refractory material, a split expansible ring for mounting said nozzle on a lower part of the body portion in coaxial relation with the lower portion of the electrode, said split expansible ring engaging in a recess in said lower part of the body portion and exerting an expansive force outwardly against the inner surface of the nozzle and frictionally retaining it on said lower part of the body portion, and means forming a gas passage through said body portion to the interior of said nozzle.

NELSON E. ANDERSON.
GEORGE R. TURBETT.

REFERENCES CITED

The following references are of record in the file of this patent:

UNITED STATES PATENTS

| Number | Name | Date |
|---|---|---|
| 1,059,626 | McAllister | Apr. 22, 1913 |
| 1,553,543 | Lincoln | Sept. 15, 1925 |
| 1,707,433 | Hand | Apr. 2, 1929 |
| 1,851,559 | Arey | Mar. 29, 1932 |
| 1,946,305 | Catlett | Feb. 6, 1934 |
| 2,376,265 | Meredith | May 15, 1945 |
| 2,468,804 | Breymeier | May 3, 1949 |
| 2,468,805 | Herbst | May 3, 1949 |
| 2,468,806 | Pilia | May 3, 1949 |
| 2,468,807 | Herbst | May 3, 1949 |
| 2,468,808 | Drake | May 3, 1949 |

OTHER REFERENCES

The Welding Journal, May 1947, page 411.